(12) United States Patent
Wan (10) Patent No.: US 9,007,489 B2
(45) Date of Patent: Apr. 14, 2015

(54) METHOD AND APPARATUS FOR IMAGE BACKGROUND REMOVAL AND REPLACEMENT

(71) Applicant: Semiconductor Components Industries, LLC, Phoenix, AZ (US)

(72) Inventor: Chung Chun Wan, Fremont, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 13/777,991

(22) Filed: Feb. 26, 2013

(65) Prior Publication Data
US 2013/0222681 A1 Aug. 29, 2013

Related U.S. Application Data

(60) Provisional application No. 61/604,456, filed on Feb. 28, 2012.

(51) Int. Cl.
*H04N 5/262* (2006.01)
*H04N 5/222* (2006.01)
*H04N 5/225* (2006.01)
*H04N 5/272* (2006.01)
*H04N 5/341* (2011.01)
*H04N 5/3745* (2011.01)

(52) U.S. Cl.
CPC ............ *H04N 5/2256* (2013.01); *H04N 5/272* (2013.01); *H04N 5/341* (2013.01); *H04N 5/37452* (2013.01)

(58) Field of Classification Search
CPC ............................ H04N 5/272; H04N 5/2354

USPC .......... 348/222.1, 371, 370, 308, 294, 216.1, 348/239, 261, 302
See application file for complete search history.

(56) References Cited

U.S. PATENT DOCUMENTS

| | | | |
|---|---|---|---|
| 7,692,696 B2 * | 4/2010 | Steinberg et al. | 348/239 |
| 2007/0263119 A1 * | 11/2007 | Shum et al. | 348/371 |
| 2008/0231737 A1 * | 9/2008 | Weale et al. | 348/308 |
| 2008/0285056 A1 | 11/2008 | Blayvas | |
| 2011/0242334 A1 * | 10/2011 | Wilburn et al. | 348/207.1 |

OTHER PUBLICATIONS

Oggier et al., "Image Sensor Technologies for 3D Time-of-Flight Range Imaging", Mesa Imaging, Bergen (2009), 10 pgs.
Wan, U.S. Appl. No. 13/353,593, filed Jan. 19, 2012.
Wan, U.S. Appl. No. 13/687,380, filed Nov. 28, 2012.

\* cited by examiner

*Primary Examiner* — Ahmed A Berhan
(74) *Attorney, Agent, or Firm* — Treyz Law Group; Michael H. Lyons (57) ABSTRACT

Electronic devices may be provided with image sensors and light sources. The image sensors may include image pixels each having a photosensitive element, first and second storage nodes, and first and second transfer transistors coupled between the photosensitive element and the first and second storage nodes. The first and second transfer transistors may be synchronized with the light source so that charges generated by the photosensitive element of each image pixel when the light source is on are transferred to the first storage node of that pixel and charges generated by the photosensitive element of each image pixel when the light source is off are transferred to the second storage node of that pixel. The light source may be an oscillating light source that is configured to turn on and off multiple times during an image exposure. The generated charges may be used in flash-matting operations.

7 Claims, 5 Drawing Sheets

METHOD AND APPARATUS FOR IMAGE BACKGROUND REMOVAL AND REPLACEMENT

This application claims the benefit of provisional patent application No. 61/604,456, filed Feb. 28, 2012, which is hereby incorporated by reference herein in its entirety.

BACKGROUND

This relates generally to imaging devices, and more particularly, to imaging devices with flash matting capabilities.

Image sensors are commonly used in electronic devices such as cellular telephones, cameras, and computers to capture images. In some situations, electronic devices are also provided with a flash and processing circuitry. The processing circuitry can be used to remove and/or replace background objects in an image with a more desirable background. For example, a user of an imaging system may wish to capture an image of a flower in front of a wall and then replace the wall in the image with an outdoor scene or other user-selected background.

One common method for removing background objects uses flash-matting operations. In a conventional flash-matting operation, a first image is captured and readout using the flash and a second image is captured and read out without using the flash. Because the flash will brighten relatively nearby objects more than it will brighten relatively distant objects, the difference in pixel values between the flash image and the no-flash image can be used to determine which image pixels in an image correspond to background objects in a scene and which correspond to foreground objects in the scene.

However, a typical flash-matting operation is subject to the restriction that no objects in the scene are moving. Because the flash image and the no-flash image are captured at different times, the moving object will appear at a different location in the flash image and the no-flash image. Pixel values associated with the moving object will be different in the flash image and the no-flash image due to the motion of the object in addition to the effect of the flash. Conventional flash-matting imaging systems can therefore misidentify moving foreground objects as background objects, thereby reducing the effectiveness of the flash-matting operations.

It would therefore be desirable to be able to provide improved imaging systems with flash-matting capabilities.

DETAILED DESCRIPTION

Digital camera modules are widely used in electronic devices such as digital cameras, computers, cellular telephones, and other electronic devices. These electronic devices may include image sensors that gather incoming light to capture an image. The image sensors may include arrays of image sensor pixels. The image sensor pixels in the image sensors may include photosensitive elements such as photodiodes that convert the incoming light into electric charges. Image sensors may have any number of pixels (e.g., hundreds or thousands or more). A typical image sensor may, for example, have hundreds, thousands, or millions of image sensor pixels (e.g., megapixels). Arrays of image sensor pixels may be coupled to power supply circuitry that is configured to provide a power supply voltage to the image pixels. An electronic device may include a light source such as a flash and processing circuitry configured to perform time-multiplexed flash-matting operations for generating background-removed and/or background-replaced images.

Figure 1:
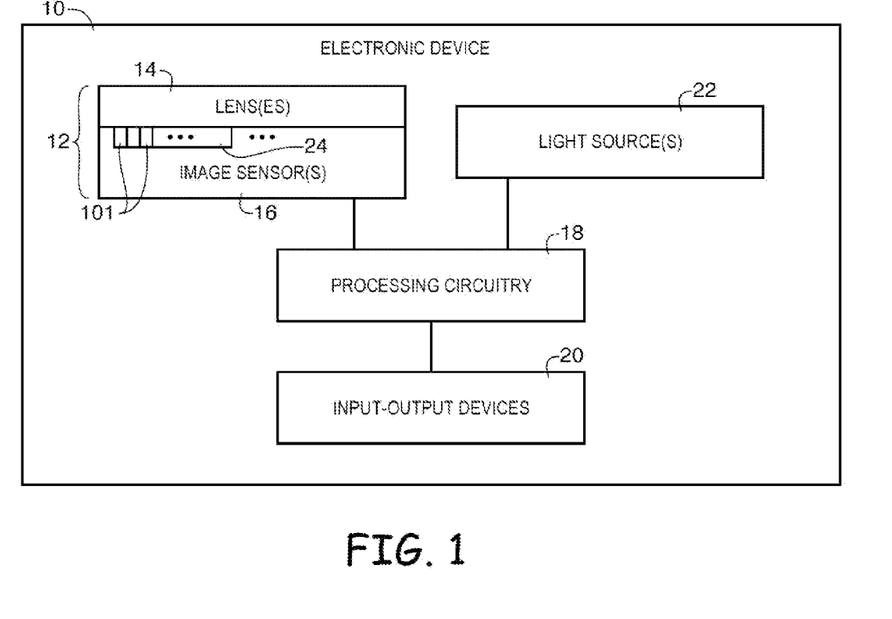
FIG. 1 is a diagram of an illustrative electronic device that contains a camera module with an image sensor, a light source, processing circuitry, and input-output devices in accordance with an embodiment of the present invention.

FIG. 1 is a diagram of an illustrative electronic device that uses an image sensor to capture time-multiplexed images for flash-matting operations. Electronic device 10 of FIG. 1 may be a portable electronic device such as a camera, a cellular telephone, a video camera, a computer, or other electronic device that captures digital image data. Camera module 12 may be used to convert incoming light into digital image data. Camera module 12 may include one or more lenses 14 and one or more image sensors 16.

Each image sensor may include one or more image pixel arrays 24 having image sensor pixels 101. During image capture operations, light from a scene may be focused onto image pixels 101 of image pixel array 24. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensor 16 or an integrated circuit within module 12 that is associated with image sensor 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Electronic device 10 may include one or more light emitting components such as light source 22 (e.g., a camera flash, an LED light source, an infrared light source, etc.). Light source 22 may be used to illuminate a real-world scene during capture of image data. Light emitted by light source 22 may be reflected off of objects in a real-world scene and detected using image pixels 101 of image sensor 16. Each image pixel 101 may include multiple storage nodes for storage of electric charge generated by incident light. Each storage node of each pixel 101 may be coupled to a photosensitive element of that pixel 101 by a storage gate such as a transfer transistor. The operation of storage gates of each image pixel may be synchronized with the operation of light source 22. For example, a first storage gate in each pixel 101 may be operated in phase with a pulsing (oscillating) light source 22 and a second storage gate in each pixel 101 may be operated out of phase with the pulsing light source 22. In this way, flash-image data (e.g., image data captured while light source 22 is on) may be transferred to the first storage node and no-flash-image data (e.g., image data captured while light source 22 is off) may be transferred to the second storage node. Multiple cycles of light source 22 (and storage gates of pixels 101) may be used to capture flash-image data and no-flash-image data for each flash image and each no-flash image.

Combined flash-image data from the first storage node of each image pixel 101 may be read out and used to generate a combined flash image. Combined no-flash-image data from the second storage node of each image pixel 101 may be read out and used to generate a combined no-flash image.

Circuitry 18 may be used to determine the locations of foreground objects and background objects using the combined flash image and the combined no-flash image. Processing circuitry 18 may generate a matte image having matte pixel values that indicate whether each pixel in the matte image is a foreground object pixel or a background object pixel.

If desired, processing circuitry 18 may be configured to remove (e.g., set to zero) all pixel values in the combined flash image or the combined no-flash image that correspond to background object pixels in the matte image.

If desired, processing circuitry 18 may be configured to replace (e.g., set to desired values) all pixel values in the combined flash image or the combined no-flash image that correspond to background object pixels in the matte image.

Figure 2:
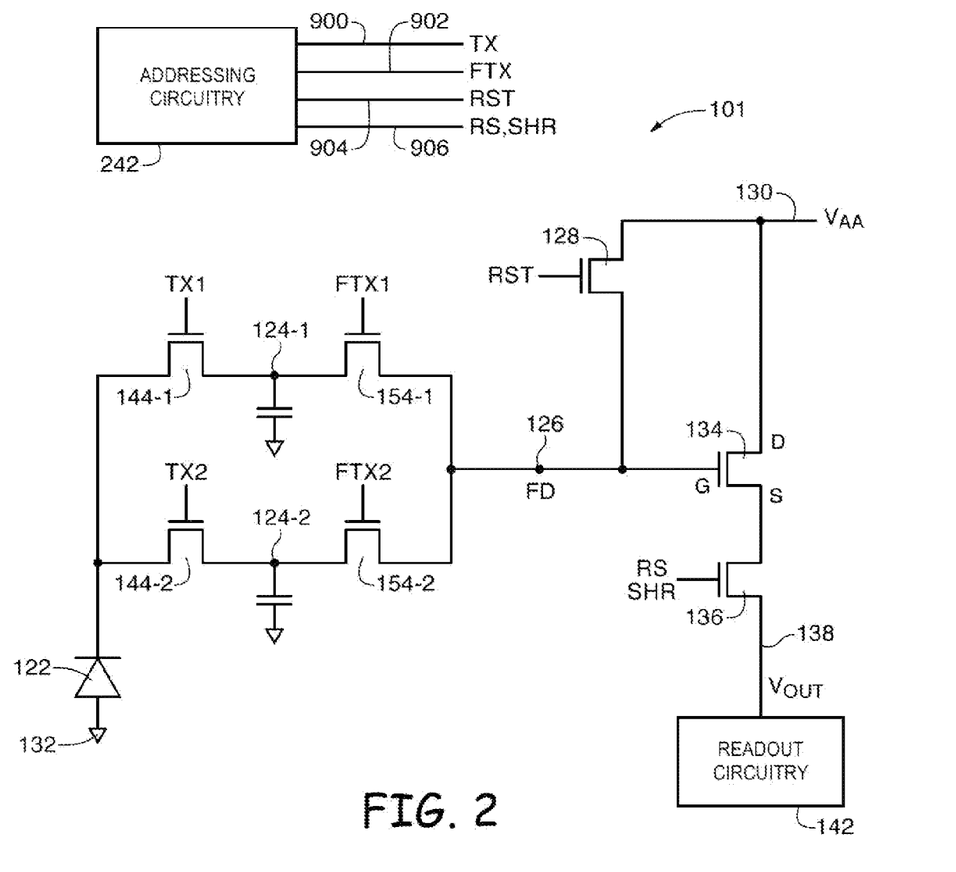
FIG. 2 is a diagram of an illustrative image sensor pixel in accordance with an embodiment of the present invention.

FIG. 2 is a circuit diagram of an illustrative multi-storage-node image pixel 101 that can be used for time-multiplexed imaging for flash-matting operations. Multi-storage-node pixel 101 may also be known as a multi-storage pixel, or as a pixel. In the example of FIG. 2, pixel 101 has two storage nodes 124 (e.g., storage nodes 124-1, 124-2), each storage node 124 having an accompanying transfer gate 144 (e.g., 144-1, 144-2) and floating diffusion node transfer gate 154 (e.g., 154-1, 154-2). If desired, pixel 101 may have other suitable number of storage nodes 124 such as three storage nodes 124, four storage nodes 124, or more storage nodes 124.

As shown in FIG. 2, multi-storage-node pixel 101 may include a photosensitive element such as a photodiode 122 coupled between a ground terminal 132 and two storage node transfer gates 144 (e.g., storage region transfer transistors 144-1, 144-2). In the example of FIG. 2, a first storage node transfer gate 144-1 may be coupled between photodiode 122 and a first storage node 124-1 and a second storage node transfer gate 144-2 may be coupled between photodiode 122 and a second storage node 124-2. Storage node transfer gates may sometimes be referred to as storage region transfer gates or as transistors. Storage nodes 124 (e.g., storage regions 124-1, 124-2) may be implemented using photodiode-like structures, capacitors, or other suitable components that store charge.

Floating diffusion node transfer gates 154 may be coupled between storage nodes 124 and a floating diffusion node 126 (e.g., a first floating diffusion node transfer gate 154-1 may be coupled between first storage node 124-1 and floating diffusion node 126, a second floating diffusion node transfer gate 154-2 may be coupled between second storage node 124-2 and floating diffusion node 126, etc.). Floating diffusion node transfer gates may sometimes be referred to as floating diffusion region transfer gates. Stored charge may be selectively transferred to floating diffusion node 126 one at a time (e.g., floating diffusion node 126 may receive charge from only one of storage nodes 124 at any given point in time during charge readout operations), or stored charge from more than one storage node 124 may be summed at floating diffusion node 126. Charge may be temporarily stored at floating diffusion node 126 prior to being read out of pixel 101.

Floating diffusion node 126 may be coupled to reset transistor 128 and source follower transistor 134. The drain D of source follower transistor 134 and reset transistor 128 may be coupled to a positive power supply terminal 130 (e.g., a power supply terminal on which a positive power supply voltage $V_{AA}$ or another reset-level voltage may be provided). A row select transistor 136 may be coupled to an output path 138 and source S of source follower 134. Output path 138 may be coupled to readout circuitry 142. Output signals $V_{OUT}$ may be formed on output path 138 for sampling by readout circuitry 142.

Incoming light may be detected by a photosensitive element such as photodiode 122. Charge may be generated in photodiode 122 from the incident light. The image sensor on which pixel 101 is formed may also include addressing circuitry 242. Addressing circuit 242 may be used to provide control signals to storage node transfer gates 144 via path 900, to floating diffusion node transfer gates 154 via path 902, to reset transistor 128 via path 904, and to row select transistor 136 via path 906. In particular, addressing circuitry 242 may feed transfer signals TX to storage node transfer gates 144 via path 900 (e.g., a first transfer signal TX1 may be fed to first storage node transfer gate 144-1, a second transfer signal TX2 may be fed to second storage node transfer gate 144-2, etc.). During exposure of the multi-storage-node image pixels 101, transfer signals TX may be asserted for a particular storage node transfer gate 144, allowing an pixel signal created by photodiode 122 in response to incoming light to flow to the associated storage node 124.

Transfer signals TX1 and TX2 may be coordinated with the operation of light source 22 (FIG. 1). For example, transfer signal TX1 may be configured to transfer charges generated by photodiode 122 when light source 22 is on and transfer signal TX2 may be configured to transfer charges generated by photodiode 22 when light source 22 is off. In this way, storage node 124-1 may be used to store flash-image data generated when light source 22 is on and storage node 124-2 may be used to store no-flash-image data generated when light source 22 is off. However, this is merely illustrative. If desired, storage node 124-1 may be used to store no-flash-image data generated when light source 22 is off and storage node 124-2 may be used to store flash-image data generated when light source 22 is off.

Addressing circuitry 242 may supply floating diffusion node transfer gate control signals FTX to floating diffusion node transfer gates 154 via path 902 (e.g., a first floating diffusion node transfer signal FTX1 may be supplied to a first floating diffusion node transfer gate 154-1, a second floating diffusion node transfer signal FTX2 may be supplied to a second floating diffusion node transfer gate 154-2, etc.). When the floating diffusion node transfer gate control signals are asserted, pixel signals stored in storage nodes 124 may be transferred to floating diffusion node 126. The pixel signals on floating diffusion region 126 are conveyed to row select transistor 136 by source-follower transistor 134. During a pixel readout phase, readout circuitry 142 may provide an asserted row select signal RS to row select transistor 136 to allow the pixel signals to be conveyed to readout circuitry 142 through output path 138. Prior to a pixel readout phase, readout circuitry 142 may assert reset signal RST to reset floating diffusion node 126 to voltage $V_{AA}$. A sample-and-hold signal SHR may then be asserted to sample the reset voltage at floating diffusion node 126.

The circuitry of pixel 101 of FIG. 2 is merely illustrative. If desired, pixels 101 may be provided with more than two storage nodes 124 or other suitable configurations for the reset and readout transistors of pixel 101 may be used.

Figure 3:
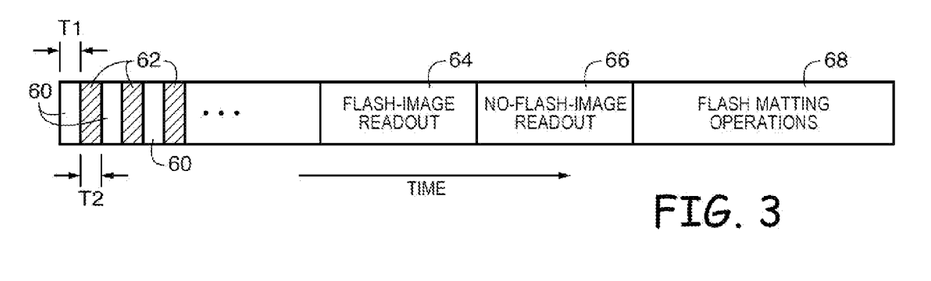
FIG. 3 is an illustrative timing diagram showing how time-multiplexed flash-image data and no-flash-image data may be gathered for flash-matting operations in accordance with an embodiment of the present invention.

An illustrative time-multiplexed image capture technique that may be used in capturing time-multiplexed flash-image data and no-flash-image data for flash-matting operations is shown in FIG. 3. In the example of FIG. 3, segments 60 and segments 62 are interleaved in time. Flash-image data may be captured and transferred to storage node 124-1 (FIG. 2) during segments 60 (e.g., segments during which light source 22 is on). No-flash-image data may be captured and transferred to storage node 124-2 during segments 62 (e.g., segments during which light source 22 is off). Flash-image data may be readout from storage node 124-1 during segment 64. No-flash-image data may be readout from storage node 124-2 during segment 66. Flash-matting operations may be performed during segment 68.

If desired, flash-matting operations may be performed concurrently with image capture and readout operations of segments 60, 62, 64, and 66 as shown in FIG. 3 or may be performed separately from image capture and readout operations of segments 60, 62, 64, and 66 (e.g., one or more flash-images and no-flash images may be stored and used for later flash-matting operations).

Segments 60 may each have a duration T1. Segments 62 may each have a duration T2. There may be the same number N of segments 60 as segments 62. Or if desired, there may be a different number of segments 60 as segments 62. For example, the number of segments 60 and the number segments 62 may differ by one. The number N may be any suitable number. For example, N may be two or more, three or more, two to ten, or other suitable numbers. Duration T1 may be 30 milliseconds (ms), less than 30 ms, more than 30 ms, less than 100 ms, less than 1 s, or any other suitable duration for capturing a portion of a flash image. Duration T2 may be the same as during T1, shorter than duration T1 or longer than duration T1. Duration T2 may be 60 milliseconds (ms), less than 60 ms, more than 60 ms, less than 200 ms, less than 1 s, or any other suitable duration for capturing a portion of a no-flash image.

During a single exposure, photo-generated charge in a photodiode may be transferred alternately between two storage nodes 124. A flash image captured using a first storage node may be formed from a combination of flash-image data captured during segments 60. A no-flash image captured using a second storage node may be formed from a combination of no-flash-image data captured during segments 62. A flash image captured in this may therefore sometimes be referred to as a combined flash image. A no-flash image captured in this may therefore sometimes be referred to as a combined no-flash image.

Figure 4:
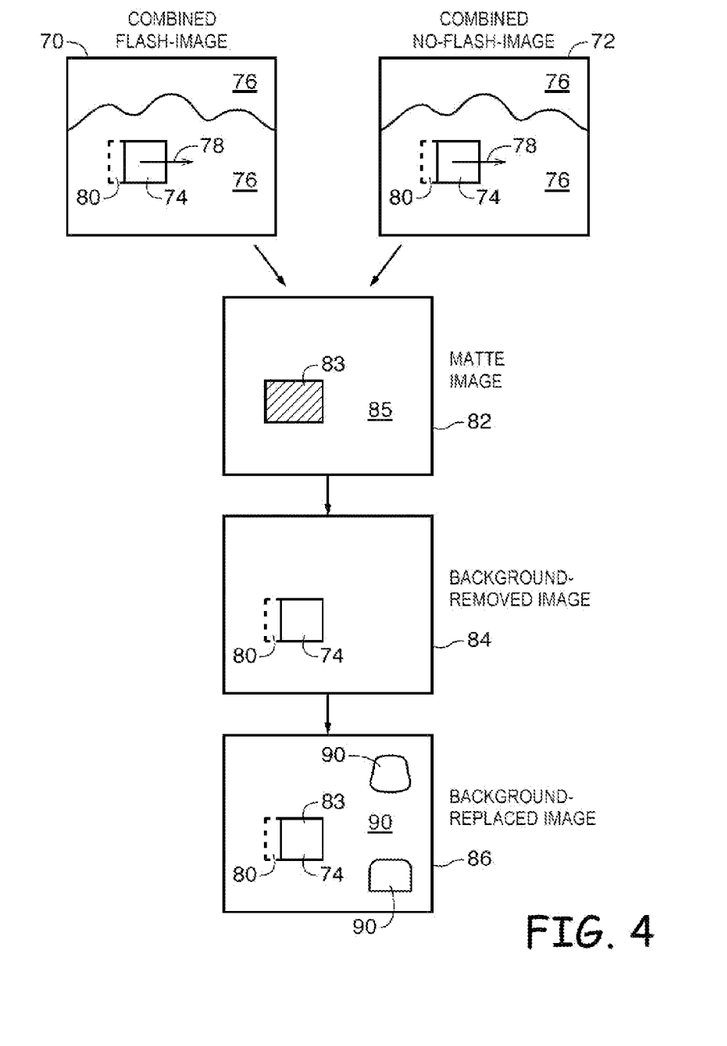
FIG. 4 is an illustrative diagram showing how a combined flash image and a combined no-flash image each generated from time-multiplexed image data may be used to generate a background-removed image and a background-replaced image in accordance with an embodiment of the present invention.

An illustrative combined flash image and an illustrative combined no-flash image that may be generated using the time-multiplexed image capture operations described above in connection with FIGS. 2 and 3 are shown in FIG. 4. Combined flash image 70 and combined no-flash image 72 may be captured using alternating charge transfers during a single exposure of an image sensor while light source 22 periodically flashes on and off. Light from a scene may be continuously incident on photodiodes in an image sensor during a single exposure. However, images 70 and 72 may still have associated exposure times that represent the total durations that charge was collected in the photodiodes for those images.

As shown FIG. 4, combined flash image 70 and combined no-flash image 72 may each include one or more foreground objects such as foreground object 74 (e.g., an object such as a human user or other object that is relatively near to device 10) and background objects 76 (e.g., a mountain and the sky). Foreground object 74 may be a moving foreground object that moved in a direction such as direction 78 during image capture operations. For example, a participant in a video conference may move around in front of camera module 12 while camera module 12 captures video images of the participant and background objects behind the participant.

Because object 74 moved during image capture operations, object 74 may include a blurred portion 80 in positions through which object 74 moved during image capture operations. However, because combined flash image 70 and combined no-flash image 72 were captured using interleaved time-multiplexed exposures that were stored on multiple storage nodes as described above in connection with FIGS. 2 and 3, the location of object 74 and blurred portion 80 are the same in both image 70 and 72. The difference in brightness between image 70 and image 72 may therefore be entirely due to the difference in flash intensity used during segments 60 and 62 (FIG. 3) even in the presence of moving objects.

As shown in FIG. 4, combined flash-image 70 and combined no-flash image 72 may be used to form matte image 82. Matte image 82 may include pixel values 83 that indicate the position of foreground object 74 (including blurred portion 80) and pixel values 85 that indicate the location of background objects 76.

By setting pixel values of image 70 and/or image 72 that correspond to background object pixels 85 of matte image 82 to zero (or any other desired common value), background objects 76 may be removed from image 70 and/or image 72 to generate background-removed image 84. Background-removed image 84 may contain only foreground objects from images 70 and 72 such as object 74.

If desired, other background objects such as replacement background objects 90 may be added to some or all of background-removed image 84 to form background-replaced image 86. Replacement background objects 90 may be a background scene that replaces all portions of image 70 or 72 that correspond to pixel values 85 of matte image 82, may be individual replacement background objects 90 or a combination of individual replacement background objects 90 and a replacement background scene.

For example, the participant in the video conference may wish to provide video of themselves to the video conference without showing background objects behind the participant. The participant may use background-removed video images 84 in which all background objects are removed and the participant appears in front of a black background, or the participant may use background-replaced video images 86 that show the participant in front of a virtual scene, a user-selected image, or any other user-selected or automatically selected replacement background scene. If desired, replacement background objects 90 may include user-selected objects, virtual objects, automatically selected objects, images of other participants in a video conference, etc.

Figure 5:
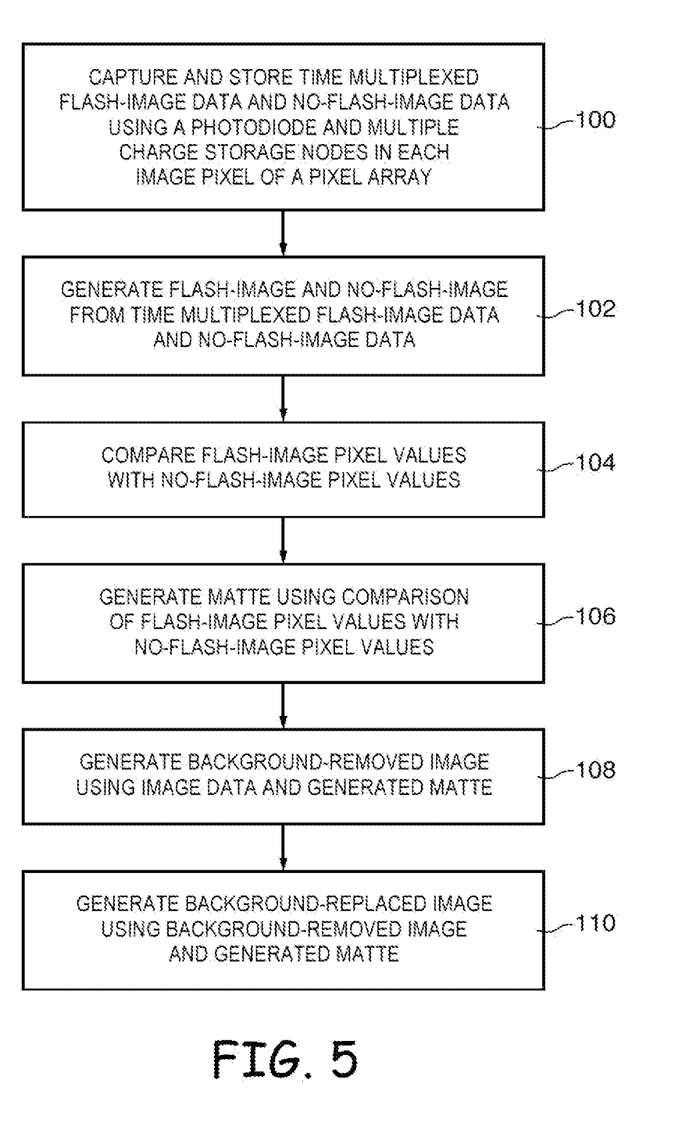
FIG. 5 is a flowchart of illustrative steps that may be used for time-multiplexed flash-matting operations using an imaging system of the type shown in FIG. 1 in accordance with an embodiment of the present invention.

FIG. 5 is a flowchart showing illustrative steps that may be used in flash-matting operations using time-multiplexed flash image data and no-flash-image data.

At step 100, an image sensor such as image sensor 16 of FIG. 1 may be used in combination with a light source such as light source 22 to capture time-multiplexed flash-image data and no-flash-image data using a photodiode and multiple charge storage nodes in each image pixel of a pixel array as described above in connection with FIGS. 2 and 3.

At step 102, a flash image and a no-flash image may be generated from the captured time-multiplexed flash-image data and no-flash-image data.

At step 104, the flash-image pixel values of the flash image may be compared with no-flash-image pixel values of the no-flash image. Comparing the flash-image pixel values with the no-flash-image pixel values may include subtracting the no-flash-image pixel values from the flash-image pixel values for overlapping pixels and comparing the subtracted pixel values to a threshold value. The threshold value may be a predetermined threshold or may be a value determined based on the pixel values of the flash image and/or the pixel values of the no-flash image.

At step 106, a matte such as matte image 82 of FIG. 4 may be generated using the comparison of the flash-image pixel values with the no-flash-image pixel values. For example, image pixels having subtracted pixel values above the threshold may be determined to represent foreground objects and image pixels having subtracted pixel values below the threshold may be determined to represent background objects.

At step 108, a background-removed image such as background-removed image 84 of FIG. 4 may be generated using the flash-image data, the no-flash-image data and the matte. Generating the background-removed image may include setting pixel values of the flash image and/or the no-flash image that correspond to background pixels of the matte image to zero (or any other desired common value).

At step 110, if desired, a background-replaced image may be generated using the background-removed image and the generated matte. Generating the background-replaced image may include adding replacement background objects to the portions of the background-removed image that correspond to portions of the matte that indicate background objects.

Figure 6:
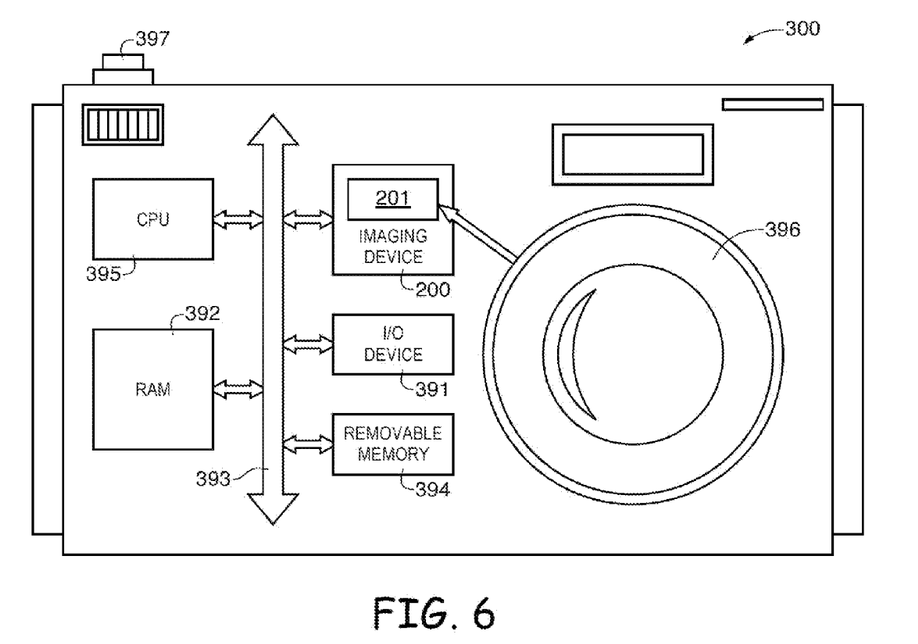
FIG. 6 is a block diagram of a processor system that may be used for the time-multiplexed flash-matting operations of FIGS. 3-5 in accordance with an embodiment of the present invention.

FIG. 6 shows in simplified form a typical processor system 300, such as a digital camera, which includes an imaging device such as imaging device 200 employing time-multiplexed image captures for flash-matting operations of the type described above in connection with FIGS. 2-5. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Pixel array 201 may have multi-storage image pixels of the type described above in connection with FIGS. 2-5. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Time-multiplexed flash/no-flash-image data may be captured with processor system 300. Flash-matting operations based on the time-multiplexed flash/no-flash-image data may be used to generate background-removed images and/or background-replaced images with processor system 300. Flash-matting operations may be performed at a hardwired image processor in processor system 300. If desired, time-multiplexed flash-image data and no-flash-image data may be processed by CPU 395 using software stored in a non-transitory computer-readable storage medium in processor system 300.

Various embodiments have been described illustrating electronic devices having image sensors and light sources configured to gather time-multiplexed flash-image data and no-flash-image data. The time-multiplexed flash-image data and no-flash-image data gathered during alternating flash/no-flash periods may be combined to form a flash image and no-flash image. Because the flash-image and the no-flash-image are generated from time-multiplexed flash-image data and no-flash-image data gathered during alternating flash/no-flash periods during an image exposure, moving objects may appear at the same location in both the flash image and the no-flash image.

Because the only difference between the flash image and the no-flash image is the intensity of the flash (e.g., the light source), foreground objects including moving foreground objects may appear substantially brighter in the flash image than in the no-flash image while background objects may appear to experience a relatively less drastic change in brightness. A matte image may be generated that includes matte image pixel values that indicate the location of foreground objects and the location of background objects in the flash image and the no-flash image.

Using the matte image, the background of the flash image and/or the no-flash image may be removed and/or replaced with a more desirable background scene or set of replacement background objects.

The image sensors may include arrays of image sensor pixels. Each image sensor pixel may include a photosensitive element and multiple charge storage regions coupled to the photosensitive element. Transfer transistors coupled between the multiple charge storage regions and the photosensitive elements may be synchronized with the light source so that charges generated by the photosensitive element when the light source is on are transferred to a first storage node and charges generated when the light source is off are transferred to a second storage node. By synchronizing the charge storage in this way and by rapidly pulsing the light source (e.g., at a pulse frequency that is too fast to be detectable by the human eye), time-multiplexed flash-image data and no-flash-image data may be gathered by the image sensor pixels to be used in flash-matting operations for moving and stationary objects.

The foregoing is merely illustrative of the principles of this invention which can be practiced in other embodiments.

What is claimed is:

1. A method of operating an electronic device having a light source and an array of image pixels, wherein each image pixel includes a photosensitive element, first and second storage nodes, and first and second transfer transistors coupled between the photosensitive element and the first and second storage nodes, the method comprising:

with the photosensitive element and the first and second storage node of each image pixel, capturing time-multiplexed flash-image data and no-flash-image data;

generating a flash image and a no-flash image from the time-multiplexed flash-image data and no-flash-image data;

comparing flash-image pixel values of the flash image with no-flash-image pixel values of the no-flash image; and generating a matte image using the comparison of the flash-image pixel values of the flash image with no-flash-image pixel values of the no-flash image, wherein the matte image includes matte pixel values that indicate whether each pixel in the matte image is a foreground object pixel or a background object pixel, wherein capturing the time-multiplexed flash-image data and no-flash-image data comprises:

turning on the light source at a first time;

turning off the light source at a second time that is after the first time;

turning on the light source at a third time that is after the second time;

turning off the light source at a fourth time that is after the third time;

with the photosensitive element and the first storage node of each image pixel, capturing and storing a first portion of the time-multiplexed flash-image data after the first time and before the second time;

with the photosensitive element and the second storage node of each image pixel, capturing and storing a first portion of the time-multiplexed no-flash-image data after the second time and before the third time;

with the first storage node of each image pixel on which the first portion of the time-multiplexed flash-image data is stored, storing a second portion of the time-multiplexed flash-image data after the third time and before the fourth time;

with the second storage node of each image pixel on which the first portion of the time-multiplexed no-flash-image data is stored, storing a second portion of the time-multiplexed no-flash-image data after the fourth time and before a fifth time that is after the fourth time; and reading out the first and second portions of the time-multiplexed flash-image data from the first storage node of each image pixel after the fifth time.

2. The method defined in claim 1 wherein the flash image and the no-flash image each include an image of a moving object and wherein the foreground object pixels of the matte image include pixels through which the moving object moved while capturing the time-multiplexed flash-image data and no-flash-image data.

3. The method defined in claim 1, further comprising:
generating a background-removed image using the time-multiplexed flash-image data and the matte image.

4. The method defined in claim 3, further comprising:
generating a background-replaced image using the background-removed image and the matte image.

5. The method defined in claim 3 wherein generating the background-removed image using the time multiplexed flash-image data and the matte image comprises:
setting pixel values in the flash image that correspond to background object pixels in the matte image to zero.

6. The method defined in claim 1 wherein capturing the time-multiplexed flash-image data and no-flash-image data further comprises:
after reading out the first and second portions of the time-multiplexed flash-image data from the first storage node of each image pixel, reading out the first and second portions of the time-multiplexed no-flash-image data from the second storage node of each image pixel.

7. The method defined in claim 1, wherein the second time is before the third time and the third time is before the fourth time.

* * * * *